United States Patent Office 2,905,685
Patented Sept. 22, 1959

2,905,685
NEW DYESTUFF OF THE PERYLENE TETRA-
CARBOXYLIC ACID SERIES

Wilhelm Eckert, Frankfurt am Main, and Hermann Remy, Bad Soden (Taunus), Germany, assignors to Farbwerke Hoechst Aktiengesellschaft vormals Meister Lucius & Brüning, Frankfurt am Main, Germany, a corporation of Germany No Drawing. Application March 18, 1957
Serial No. 646,534

Claims priority, application Germany March 22, 1956

1 Claim. (Cl. 260—281)

The present invention relates to a new valuable dyestuff of the perylene tetracarboxylic acid series, more particularly it relates to a dyestuff corresponding to the following formula:

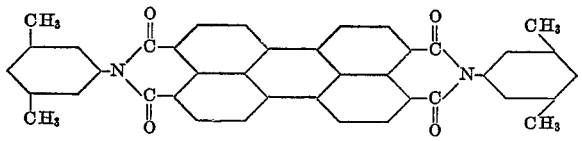

In our U.S. patent application Serial No. 661,261, filed May 23, 1957, now abandoned, for "New Dyestuff of the Perylene Tetracarbocyclic Acid Series," is described a process for the manufacture of a dyestuff which can be used with special advantage for coloring plastics, such as polyvinyl chloride containing a plasticizer or polyethylene, lacquers and printing inks, which comprises condensing perylene-3,4,9,10-tetracarboxylic acid or its anhydride with paracyclohexyl-aniline. The colored products are distinguished by very good properties of fastness.

Now we have found that a dyestuff of similar excellent properties is obtained by reacting perylene-3,4,9,10-tetracarboxylic acid or its anhydride with 1-amino-3,5-dimethylbenzene. This fact is very surprising since the condensation products of perylene tetracarboxylic acid with the isomeric 1-amino-2,6-dimethylbenzene or the 1-amino-2,4-dimethylbenzene possess only poor fastness properties.

The new dyestuff is very suitable as pigment in the printing ink and lacquer industries, for fast coloring plastics, such as polyvinyl chloride containing a plasticizer or polyethylene, furthermore for coloring so-called bakable lacquers or for dyeing the spinning solution.

The following examples serve to illustrate the invention, but they are not intended to limit it thereto, the parts being by weight unless otherwise stated, and the relationship of parts by weight to parts by volume being the same as that of the kilogram to the liter:

Example 1

20 parts of perylene-3,4,9,10-tetracarboxylic acid dianhydride and 10 parts by volume of concentrated hydrochloric acid are introduced successively into 200 parts of 1-amino-3,5-dimethylbenzene, while stirring. The mixture is heated for 12 hours at 210–220° C., while continuously distilling off the water. The product is suction-filtered in the cold, washed once or twice with methanol, boiled several times with dilute sodium hydroxide solution, washed with hot water until neutral, and dried.

The red dyestuff which crystallizes from quinoline in short prisms does not melt at a temperature up to 300° C., is difficultly soluble in the customary organic solvents and dissolves in concentrated sulfuric acid to a violet to claret solution without fluorescence. It is distinguished by an extraordinary brightness and excellent fastness properties, both in lacquers and in plastic materials such as, for example, polyvinyl chloride mixtures, and possesses a very good fastness to oil, to over-spraying, to solvents, to bleeding and to light.

Example 2

20 parts of perylene-3,4,9,10-tetracarboxylic acid dianhydride, 35 parts of 1-amino-3,5-dimethylbenzene and 10 parts by volume of concentrated hydrochloric acid are introduced successively into 400 parts by volume of quinoline, while stirring. The mixture is heated for 14 hours at 200–210° C. while continuously distilling off the water. The product is then suction-filtered in the cold and worked up as described in Example 1. The dyestuff so obtained is identical with the product described in Example 1.

We claim:
The dyestuff corresponding to the following formula

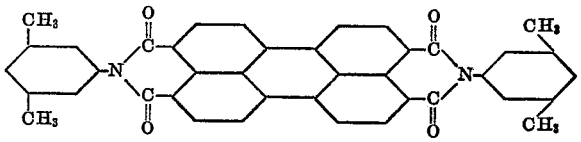

References Cited in the file of this patent
FOREIGN PATENTS
101,759    Switzerland _____ Oct. 16, 1923